(12) United States Patent
Chou

(10) Patent No.: US 10,569,517 B2
(45) Date of Patent: Feb. 25, 2020

(54) SELECTIVELY PERMEABLE ETHYLENE COPOLYMER COMPOSITIONS

(71) Applicant: PERFORMANCE MATERIALS NA, INC., Midland, MI (US)

(72) Inventor: Richard T Chou, Hockessin, DE (US)

(73) Assignee: Performance Materials NA, INC., Midland, MI (US)

( * ) Notice: Subject to any disclaimer, the term of this patent is extended or adjusted under 35 U.S.C. 154(b) by 0 days.

(21) Appl. No.: 15/903,364

(22) Filed: Feb. 23, 2018

(65) Prior Publication Data

US 2018/0178496 A1 Jun. 28, 2018

Related U.S. Application Data

(63) Continuation of application No. 14/575,097, filed on Dec. 18, 2014, now abandoned.

(60) Provisional application No. 61/918,703, filed on Dec. 20, 2013.

(51) Int. Cl.

| | |
|---|---|
| *B32B 3/00* | (2006.01) |
| *B32B 27/32* | (2006.01) |
| *C08J 5/18* | (2006.01) |
| *B32B 5/02* | (2006.01) |
| *B32B 27/12* | (2006.01) |
| *B32B 27/10* | (2006.01) |
| *B32B 27/28* | (2006.01) |
| *B32B 3/26* | (2006.01) |
| *D04H 1/724* | (2012.01) |

(52) U.S. Cl.
CPC .............. *B32B 27/32* (2013.01); *B32B 3/266* (2013.01); *B32B 5/022* (2013.01); *B32B 5/024* (2013.01); *B32B 27/10* (2013.01); *B32B 27/12* (2013.01); *B32B 27/28* (2013.01); *B32B 27/285* (2013.01); *C08J 5/18* (2013.01); *D04H 1/724* (2013.01); *B32B 2262/0253* (2013.01); *B32B 2262/0269* (2013.01); *B32B 2262/101* (2013.01); *B32B 2307/724* (2013.01); *B32B 2419/00* (2013.01); *B32B 2437/00* (2013.01); *B32B 2535/00* (2013.01); *B32B 2553/00* (2013.01); *C08J 2351/06* (2013.01); *C08J 2423/06* (2013.01); *C08J 2423/08* (2013.01); *C08L 2203/16* (2013.01); *D10B 2321/021* (2013.01); *D10B 2321/022* (2013.01); *D10B 2331/04* (2013.01); *D10B 2505/18* (2013.01); *D10B 2505/20* (2013.01)

(58) Field of Classification Search
CPC ........ B32B 27/32; B32B 5/002; B32B 3/266; B32B 27/28; B32B 5/024; B32B 2419/00; B32B 2553/00; B32B 2437/00; B32B 27/102; B32B 27/285; B32B 27/10; B32B 2535/00; B32B 2262/101; B32B 2262/0253; E04B 1/665; C08L 35/02; C08J 2423/06; C08J 5/18; C08J 2423/08; C08J 2351/06; D10B 2505/18; D10B 2331/04; D10B 2321/021; D10B 2505/20; D10B 2321/1022
USPC .......................................................... 442/59
See application file for complete search history.

(56) References Cited

U.S. PATENT DOCUMENTS

| | | | |
|---|---|---|---|
| 2,897,183 A | 7/1959 | Christl et al. | |
| 3,350,372 A | 10/1967 | Anspon et al. | |
| 3,351,495 A | 11/1967 | Larsen et al. | |
| 3,756,996 A | 9/1973 | Pugh et al. | |
| 3,972,961 A | 8/1976 | Hammer et al. | |
| RE30,754 E | 9/1981 | Hammer et al. | |
| 4,351,931 A | 9/1982 | Armitage | |
| 4,908,260 A * | 3/1990 | Dodia | B32B 25/04 428/215 |
| 4,937,115 A | 6/1990 | Leatherman | |
| 5,028,674 A | 7/1991 | Hatch et al. | |
| 5,198,401 A | 3/1993 | Turner et al. | |
| 5,405,922 A | 4/1995 | De Chellis et al. | |
| 5,532,066 A | 7/1996 | Latiolais et al. | |
| 6,579,948 B1 | 6/2003 | Tan et al. | |
| RE38,429 E | 2/2004 | Eichbauer | |
| 7,514,380 B2 | 4/2009 | Chen et al. | |
| 9,441,100 B2 | 9/2016 | Chou | |
| 2005/0187315 A1 | 8/2005 | Dean | |
| 2010/0273379 A1* | 10/2010 | Chen | B32B 27/12 442/59 |

(Continued)

OTHER PUBLICATIONS

Lee et al, Moisture Effects on Isobutylene-Isoprene Copolymer-Based Composite Barrier. I: Moisture Diffusion and Detection, Polymer Engineering & Science, 1996, 36, 1217.
Chou et al, High Flexibility EMA Made from High Pressure Tubular Process, Annual Technical Conference—Society of Plastics Engineers (2002), 60th (vol. 2), 1832-1836.

(Continued)

Primary Examiner — Jessica Whiteley

(57) ABSTRACT

Disclosed is a selectively permeable protective structure, a method for providing personal protection from exposure to harmful chemical and biological agents using an article that provides a barrier to such agents and a method for limiting damage to the article due to corrosion or mold growth, comprising wrapping or covering the article in the selectively permeable protective structure. The selectively permeable structure comprises a membrane comprising a copolymer comprising copolymerized units of ethylene and copolymerized units of a comonomer providing an amine-reactive site combined with a short chain polymer having from about 5 to 50 repeat units and containing one primary amine active amine site, having a moisture vapor permeation value of at least 200 g-mil/m$^2$/24 h and barrier to liquid water, and optionally a supporting substrate.

22 Claims, No Drawings

(56) References Cited

U.S. PATENT DOCUMENTS

2011/0077347 A1* 3/2011 Reinartz ................ C08L 39/06
524/508
2015/0175792 A1   6/2015 Chou et al.

* cited by examiner

SELECTIVELY PERMEABLE ETHYLENE COPOLYMER COMPOSITIONS

CROSS REFERENCE TO RELATED APPLICATION

This application claims priority under 35 U.S.C. § 120 as a continuation of co-pending U.S. patent application Ser. No. 14/575,097, filed on Dec. 18, 2014, which in turn claims priority under 35 U.S.C. § 119(e) from U.S. Provisional Patent Application No. 61/918,703, filed Dec. 20, 2013, now expired, each of which is hereby incorporated herein by reference in its entirety.

FIELD OF THE INVENTION

This invention relates to a selectively permeable composition and structure having high moisture vapor permeability and low permeability to others such as chemicals and to articles made therefrom.

BACKGROUND

Personal protection from exposure to harmful chemical and biological agents is often of concern to firefighters, medical practitioners and similarly situated personnel. Such protection often includes the use of apparel that provides a barrier to such agents. Butyl rubber is often used in standard protective clothing. However, garments made from butyl rubber are bulky and nearly impermeable to air and moisture (I. Lee, Yang and Wilusz; Polymer Engineering & Science, 1996, 36, 1217) resulting in unbearable levels of heat inside the garments during use. Other protective apparel includes textiles coated with polymeric materials to provide a chemical and/or biological barrier.

Various permeable materials having a wide range of mechanical and transport properties are known. Depending upon the particular application in which the permeable material is to be employed, however, certain combinations of properties are required. For example, in a protective apparel application, it is desirable that the material may transport water vapor and block the transport of harmful chemicals and/or biological agents, and be lightweight and flexible over a broad temperature range. A need exists for a material that can be a flexible, solid material with membrane characteristics that facilitate the transport of water vapor, for example, from a wearer of membrane-containing apparel to the atmosphere; allow moisture to permeate the garments to the extent necessary to afford comfort to the wearer, thus reducing heat stress; and block entry of certain chemical compounds and biological agents.

Equipment is often wrapped or packaged with film or fabric tarpaulins, hoods or other covers to prevent surface damage during transportation and storage. These covers may be prepared from highly moisture impermeable films and fabric.

Many relatively small items are shipped on pallets, that is, platforms that are easily moved by forklifts or small cranes. Pallets provide convenience in loading and unloading goods from shipping containers, and in moving smaller amounts of goods over shorter distances, such as in warehouses or to deliver a retail quantity. The small items may be unpackaged or packaged, for example in bags or boxes, when they are placed on the pallets.

A loaded pallet preferably has integrity and stability so that the goods are not damaged or lost during shipping. To provide the necessary integrity and stability, the pallet and its load have been typically wrapped together in film, for example overlapping layers of polyethylene stretch wrap that may be applied by machine or by hand; see, e.g., U.S. RE38429. Other generally practiced methods of providing integrity and stability to loaded pallets include wrapping the pallet and its load in heat shrinkable film, encasing the loaded pallet in a sheath or "hood" which may be heat shrinkable or stretchable, and containing the goods in a single carton or box. These methods are sometimes referred to, individually or collectively, as "pallet unitizing".

Using barrier films for wrapping small objects or articles in sealed bags is generally suitable since the object may be dried before being sealed in the bags and/or drying agents may be included inside the sealed bags. This approach is less suitable for large objects such as vehicles, boats, motors, machinery, industrial goods, pallets or containers holding smaller articles, and other bulky equipment because the covers are typically not hermetically sealed around the object and thorough drying of the object may not be feasible. This may be especially problematic during storage or when shipping by ship or railroad, because the large objects may be exposed to adverse weather conditions for long periods of time. Atmospheric moisture and/or rain may enter the space under the cover and be trapped and condense. With high barrier covers, there is no way for water to permeate back outside the cover, resulting in a buildup of moisture inside the cover, leading to the possibility of corrosion.

Large amounts of money are lost each year because of corrosion of, for example, iron, steel, and other metals. There are many factors affecting corrosion rate including moisture, oxygen, and salt presence. A common corrosion occurs due to electrochemical reactions at high humidity conditions. For example, when iron is exposed to moist air, it reacts with oxygen to form rust (iron oxide). The result of corrosion may be the formation of metal oxide that flakes off easily, causing extensive pitting thereby causing structural weakness and disintegration of the metal. Corrosion can also affect other properties of metal parts such as reducing conductivity or increasing surface roughness so that moving parts become unable to move freely.

In addition to corrosion of metals, mold growth may occur in the condensed moisture on the surface of the equipment.

Using a film or cover with a high water vapor transmission rate can prevent condensation of water inside the cover by allowing equilibration of the trapped moisture back into the surrounding atmosphere. Using such a film prevents or reduces rust formation and corrosion and reduces the opportunity for mold growth.

Many previous permeable membranes are microporous (i.e., permeable due to the presence of microscopic pores through which vapor can pass). Microporous membranes, which may be laminated on or between nonwoven textiles, have increased permeability, but may not provide adequate barriers to liquids because of their nonselective permeability. Liquids under pressure may be able to penetrate the pores. Most microporous films are biaxially oriented, so only a small amount of shrinkage is possible, and they cannot be shrunk without losing their porosity. They may also have low tear strength and their surfaces may be easily fouled, thereby losing permeability.

Various references describe semipermeable materials produced from a variety of polymers that may be useful for protective covers (e.g., U.S. Pat. No. 6,579,948). Thermoplastics with high moisture permeation are used for a wide range of applications, such as surgical garments, films for textile lamination for sports and leisure. Hydrophilic block copolymers, such as poly(ether-co-amide) (Pebax®) and poly(ether-co-ester) (Hytrel®) are preferred materials, where the soft polyether blocks provide hydrophilic and flexibility and the hard polyamide blocks or polyester blocks enhance mechanical integrity. Recently protective fabrics comprising a selectively permeable membrane comprising organic acid-modified ionomer compositions have been disclosed (U.S. Pat. No. 7,514,380).

However, those polymers are not free of problem in applications. One of the major disadvantages of block polyethers such as Pebax® and Hytrel® is a lack of compatibility to polyolefin. The block copolymers have poor adhesion to polyolefins and are difficult to blend with polyolefins. For example, Pebax® is difficult to adhere to polyethylene- and polypropylene-based nonwoven fabrics. Also the melting temperature for Pebax® can be too high for laminating with polyolefin based substrates without causing deformation. These factors significantly restrict the use of the block copolyethers in protective fabric applications.

Because no single material has emerged which satisfies all of the technical requirements and that presents a cost-effective alternative, it is desirable to provide a selectively permeable membrane or structure or layer that displays a combination of mechanical properties, low temperature flexibility, selective transport, ease of processability, and cost-effectiveness, so as to render it suitable for use as a protective cover for objects that limits corrosion and/or mold growth. There is also a practical need to have a breathable material that is compatible with polyolefins.

SUMMARY OF THE INVENTION

This invention provides a selectively permeable structure or article comprising a selectively permeable composition comprising or consisting essentially of (a) a copolymer comprising copolymerized units of ethylene and copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer, wherein the amine-reactive site is present in the copolymer in an amount of from 3 to 25 weight %; and (b) a short chain polymer having from about 5 to 50 repeat units and containing one primary amine active amine site, the remainder of the side chain polymer being substantially unreactive with the amine-reactive sites of the copolymer of (a) and comprising propylene oxide, ethylene oxide, or mixture thereof, in an amount of about 20 to about 50 parts by weight per 100 parts by weight of (a); and a substrate wherein the substrate or a portion thereof is coextruded, impregnated, incorporated, laminated embedded or coated with the composition.

In a particular aspect the composition comprises an ethylene graft copolymer comprising polyetherimide segments, wherein the ethylene graft copolymer comprises, consists essentially of, or is produced from, a trunk copolymer comprising copolymerized units of ethylene, copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer; and at least one type side chain polymer linked to said reactive sites through imide linkages, said side chain polymer being derived from a short chain polymer having from about 5 to 50 repeat units and containing one primary amine active amine site, the remainder of the side chain polymer being substantially unreactive with the amine-reactive sites of the trunk copolymer and comprising propylene oxide, ethylene oxide, or mixture thereof.

The selectively permeable composition may further comprise (c) an additional polymer present in an amount of about 10 to about 50 weight % of the combination of (a), (b) and (c), comprising or consisting essentially of polyethylene homopolymers, polyethylene copolymers, polypropylene homopolymers or polypropylene copolymers; or at least one ethylene copolymer comprising copolymerized units of ethylene and copolymerized units of a polar comonomer selected from vinyl acetate, alkyl methacrylate, alkyl acrylate, carbon monoxide or mixtures thereof, wherein said polar comonomer is present in the copolymer in an amount from about 6 to about 40 weight %.

The selectively permeable structure can be used as a protective article. Notably, the composition has a moisture vapor permeation value (MVPV) of at least 200 g-mil/m$^2$/24 h and high water-entry pressure; and the selectively permeable structure has a moisture vapor transmission rate (MVTR) of at least 30 g/m$^2$/24 h. The MVPV and MVTR are measured at 37.8° C. and 100% relative humidity according to ASTM F-1249.

The invention also provides a method for providing personal protection from exposure to harmful chemical and biological agents using apparel that provides a barrier to such agents, the apparel comprising a selectively permeable structure described above.

An article that can provide a permeable protective structure or article comprises, consists essentially of, consists of, or is produced from, a substrate and a selectively permeable membrane wherein the article is selectively permeable to moisture and can have a moisture vapor transmission rate (MVTR) measured according to ASTM F2298 of at least 1800 g/m$^2$/24 h;

the substrate comprises a textile or a porous sheet material; and the membrane can comprise, consist essentially of, consist of, or be produced from the composition disclosed above.

A method for limiting damage to an article due to corrosion or mold growth, comprising wrapping or covering the article in a selectively permeable protective structure wherein the structure can be the same as those disclosed above.

DETAILED DESCRIPTION OF THE INVENTION

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Unless stated otherwise, all percentages, parts, ratios, etc., are by weight. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range starting from 0, such component is an optional component (i.e., it may or may not be present). When present an optional component may be at least 0.1 weight % of the composition or copolymer.

When the term "about" is used in describing a value or an end-point of a range, the disclosure should be understood to include the specific value or end-point referred to.

Use of "a" or "an" are employed to describe elements and components of the invention. This is done merely for convenience and to give a general sense of the invention. This description should be read to include one or at least one and the singular also includes the plural unless it is obvious that it is meant otherwise.

The term "consisting essentially of" in relation to compositions is to indicate that substantially (greater than 95 weight % or greater than 99 weight %) the only polymer(s) present in a component layer is the polymer(s) recited. Thus this term does not exclude the presence of additives, e.g. conventional film additives; i.e. each layer independently may contain conventional film additives such those described below. Moreover, such additives may possibly be added via a masterbatch that may include other polymers as carriers, so that minor amounts (less than 5 or less than 1 weight %) of polymers other than those recited may be present, wherein these minor amounts do not change the basic and novel characteristics of the invention.

As used herein, the term "copolymers" can describe polymers obtained by copolymerization of at least two different monomer species. The term "terpolymer" can be used to specifically describe a copolymer that is obtained from copolymerization of three different monomer species.

This invention relates to articles in the form of films, sheets, textile laminates, or parts prepared from polymeric compositions which can be molded or extruded to prepare moisture permeable nonporous films or sheets. Such polymer compositions contain an E/MAME grafted with polyetheramine (PEO-g-E/MAME) or blends of PEO-g-E/MAME with polyethylene, polypropylene or ethylene copolymers containing copolymerized units of a polar comonomer in one layer of the article.

"Selectively permeable" means permeation is allowed only to certain molecules in a specific state such as vapor or gas and not to other molecules or in a different state such as liquid or solid. Such molecules can be dissolved or dispersed in the matrix of certain materials such as a film or sheet of the composition disclosed herein and thereafter be diffused or migrated through the material.

The composition can be formed into a monolithic or continuous membrane that functions as a selectively permeable barrier. Monolithic continuous membranes, in contrast to microporous membranes, have high water-entry pressure and are waterproof and liquidproof. High water-entry pressure refers to >150 cm (or >250 cm or >500 cm) $H_2O$ hydrostatic head, as described in DIN EN20811:92.

Therefore, monolithic membranes provide barriers to liquids such as water, while still allowing permeability to water vapor under appropriate conditions. A monolithic barrier is also effective at preventing exposure to liquids such as water, solvents, oils, corrosive fluids and the like, or particulates or solids, including dust, irritants, mold spores, allergens, pollen, animal dander, hair and the like.

The selectively permeable membrane may be selective to liquid penetrants depending on the size and polarity of the penetrants, i.e., has selectivity so as to be capable of allowing water to diffuse through at a higher rate than virtually all organic liquids having a molecular weight higher than that of methanol.

The selectively permeable composition may have MVPV of at least 200, at least 800, at least 900, at least 1200, at least 2000, at least 4,000 g-mil/m$^2$/24 h, or even higher. MVPV is an indicator of the inherent permeability of the composition, by measuring moisture permeation of a membrane comprising the composition, which may be a film or sheet that is normalized to 1 mil thickness.

Selectively permeable protective articles may have MVTR of at least 30, at least 50, at least 100, at least 500, or at least 1000 g/m$^2$/24 h, or even higher. MVTR measures total moisture vapor transmitted through an article across its smallest dimension during a unit time, disregarding the structure thickness. For a membrane of a given composition and MVPV, MVTR decreases as the thickness increases.

A selectively permeable article of this invention provides a combination of mechanical properties, low temperature flexibility, selective transport, ease of processability, and cost-effectiveness. In one embodiment, this invention is an article that comprises a composition that has selectively permeable properties. Articles such as blown films prepared from blends of polyolefin and graft copolymers comprising an ethylene and a dicarboxylic monomer grafted with polyetheramine exhibit moisture permeation that correlates to the amount of polyetheramine content. The blends showed excellent temperature resistance as reflected from high melting point and high heat of fusion above 90° C. and also showed the capability to be sealed by thermal or high frequency welding or sealing. The blends are soft and highly flexible with excellent mechanical properties. The blends exhibit high adhesion (bonding) to polyethylene or polypropylene substrates for producing final products such as laminates of the composition to films, nonwoven textiles, etc. The preparation of permeable protective structures is straightforward and versatile.

The compositions of this invention comprise a copolymer containing a comonomer that provides an amine-reactive site selected from the group consisting of an anhydride group, a vicinal pair of carboxylic groups and a carboxylic group adjacent to an alkoxycarbonyl group that is not present in the first polar copolymer. This copolymer is obtained by copolymerization of at least ethylene and at least one comonomer capable of copolymerizing with ethylene such as an anhydride or a functional equivalent thereof, such as a vicinal pair of carboxylic groups or a carboxylic group adjacent to an alkoxycarbonyl group, wherein the alkoxy group contains up to 20 carbon atoms and the comonomer provides an amine-reactive site in the copolymer. The comonomer includes $C_4$-$C_8$ unsaturated anhydrides, $C_4$-$C_8$ unsaturated acids having at least two carboxylic groups, monoesters or diesters of $C_4$-$C_8$ unsaturated acids having at least two carboxylic groups, and mixtures thereof.

Examples of suitable comonomers include unsaturated anhydrides such as maleic anhydride, and itaconic anhydride; 1,4-butenedioic acids (e.g. maleic acid, fumaric acid, itaconic acid and citraconic acid); and $C_1$-$C_{20}$ alkyl monoesters of the 1,4-butenedioc acids, including methyl hydrogen maleate, ethyl hydrogen maleate, propyl hydrogen fumarate, and 2-ethylhexyl hydrogen fumarate. Of these, maleic anhydride, ethyl hydrogen maleate and methyl hydrogen maleate are preferred. Maleic anhydride and ethyl hydrogen maleate (EHM) are most preferred.

Preferred are copolymers of ethylene and monoalkyl maleates (also known as alkyl hydrogen maleates). As used herein, the term "ethylene/monoalkyl maleate copolymers"

refers to such copolymers prepared from ethylene and a maleic acid monoester (sometimes referred to as a "half-ester", wherein one carboxyl group of the maleic moiety is esterified and the other is an unesterified carboxylic acid).

Terpolymers or tetrapolymers comprise comonomers in addition to the ethylene and amine-reactive comonomer. Preferably, the additional comonomers are less reactive to amines than the amine-reactive site comonomer. The copolymers include E/X/Y terpolymers, wherein E is ethylene; X is a monomer selected from the group consisting of vinyl acetate, and alkyl (meth)acrylates; and Y is a maleic acid monoester, including maleic monoesters of $C_1$ to $C_4$ alcohols, such as for example, methyl, ethyl, n-propyl, isopropyl, and n-butyl alcohols, wherein X is less than 15 weight %, and preferably less than 5 weight % of the terpolymer. Examples of monomers suitable for inclusion as component X are (meth)acrylic acid esters of $C_1$ to $C_4$ alcohols. For example, suitable acrylate esters include methyl acrylate and butyl acrylate and suitable alkyl methacrylate esters include methyl methacrylate and n-butyl methacrylate. Preferably, when the copolymer is a higher order polymer such as a terpolymer, the combined comonomers other than ethylene are present in about 6 to about 30 weight % of the copolymer. For such copolymers, the alcohol moiety used in the maleic acid monoester comonomer may be the same as that used in the alkyl (meth)acrylate comonomer, or it may be different.

Specific examples of the copolymer include ethylene/maleic acid monoester dipolymers such as ethylene/ethyl hydrogen maleate dipolymer, ethylene/maleic acid monoester/methyl acrylate terpolymers, ethylene/maleic acid monoester/methyl methacrylate terpolymers, ethylene/maleic acid monoester/ethyl acrylate terpolymers, ethylene/maleic acid monoester/ethyl methacrylate terpolymers, ethylene/maleic acid monoester/n-butyl acrylate terpolymers and ethylene/maleic acid monoester/n-butyl methacrylate terpolymers.

Of particular note are ethylene/alkyl hydrogen maleate copolymers wherein the alkyl group is ethyl.

The copolymer may comprise about 6 to about 25 weight % copolymerized units of the amine-reactive comonomer, based on the weight of the copolymer. Alternatively, the level of copolymerized units of the amine-reactive comonomer (for example ethyl hydrogen maleate) is from a lower limit of about 6, 8 or about 10 weight % to an upper limit of about 18, about 20, or about 25 weight % based on the total weight of the copolymer.

The copolymer may have a melt index from about 5 to about 400 g/10 min., preferably about 5 or about 10 to about 100 g/min. A representative copolymer is a random copolymer having a melt index of about 5 to 100 grams/10 minutes and consisting essentially of copolymerized ethylene and a monoalkyl ester of a 1,4-butenedioic acid in which the alkyl group of the ester has 1 to 4 carbon atoms. Preferably, the trunk copolymer is a dipolymer of ethylene and about 4 to about 25 weight %, or more preferably about 8 to about 20 weight %) of ethyl hydrogen maleate (an "EMAME" copolymer). A specific polymer may comprise from about 8 to about 10 weight % of ethyl hydrogen maleate. Another specific copolymer comprises about 15 weight % of ethyl hydrogen maleate. Such copolymers are commercially available from DuPont under the tradename Fusabond®.

Ethylene/ethyl hydrogen maleate/alkyl ester terpolymers are also known. For example, a terpolymer of 46.4% ethylene, 50% methyl acylate and 3.6% of monoethyl maleate is described in U.S. Pat. No. 3,972,961. Preferably, the amount of MAME in the copolymer is from about 6 to about 20 weight % and the amount of additional comonomer (vinyl acetate, alkyl acrylate or alkyl methacrylate is less than or equal to 15 or less than or equal to 6 weight % of the terpolymer.

Preferably the EMAME copolymer or the EMAME terpolymer has a melting point higher than 80° C.

These copolymers may be synthesized by random copolymerization of ethylene and the particular comonomer(s) in a high-pressure free radical process, generally an autoclave process. For example, ethylene/monoalkyl maleate copolymers can be obtained using a suitable high-pressure process described, for example, in U.S. Pat. No. 4,351,931, the teachings therein incorporated herein by reference. Some examples of this type of ethylene/ester copolymer are described in U.S. Patent Application Publication 2005/0187315.

Short Chain Polymers

The composition also comprises short chain polymers or oligomers having about 5 to 50 repeat units with one reactive end group comprising a primary amine, and the other end and/or substituent groups are substantially unreactive. Polyetheramines suitable for use as the short chain oligomer or polymer contain primary amino groups at the end of a polyether backbone. Examples of short chain polymers include polymers of organic oxides containing 2 to 16 carbon atoms, e.g., ethylene oxide, propylene oxide, 1,2-butylene epoxide, 1,4-butylene epoxide, styrene oxide, 1,2-diphenyl ethylene oxide, dioxolane, and copolymers of said organic oxides containing 2 to 16 carbon atoms, with a primary amine at one end. The average molecular weight (Mw) of the polyetheramine is in the range of 300 to 5000, preferably 500 to 3000.

Polyetheramines based on propylene oxide, ethylene oxide, or a mixture of both, are available commercially from Huntsman Chemical under the tradename Jeffamine®. Examples include Jeffamine® M-600 ($M_W$ approximately 600, 9/1 PO/EO ratio), Jeffamine® M-1000 ($M_W$ approximately 1000, 3/19 PO/EO ratio), Jeffamine M-2005 ($M_W$ approximately 2000, 29/6 PO/EO ratio) and Jeffamine M-2070 ($M_W$ approximately 2000, 10/31 PO/EO ratio).

The base resin polymer(s), the copolymer with amine-reactive sites and the short chain copolymer can be combined as a physical blend such as a salt and pepper pellet blend for further thermoplastic processing.

The short chain polymers can be linked to the amine-reactive sites of the copolymer of (b) to provide thermoplastic graft copolymers via the amine end as described in greater detail below.

Thermoplastic graft copolymers described herein are prepared by treating a trunk copolymer having amine-reactive sites with at least one side chain polymer having about one active primary amine site; the other groups or ends of the side chain polymer are substantially unreactive with the reactive sites on the trunk copolymer. In the final graft copolymer the trunk copolymer content ranges in an amount of about 25 to 95 weight % and the side chain polymer content ranges from about 5 to 75 weight %. The trunk copolymers contain, on a number average, about 300 to 50,000, preferably 500 to 20,000, chain atoms, and a number of amine reactive sites occurring, on the average, at a frequency of about one to 200 per 1000 chain atoms of the trunk copolymer. On the average there will be at least one active site per trunk copolymer chain. The side chain polymer will in general be shorter than the trunk copolymer, ranging in length from about 25 to 1,000 chain atoms, preferably about 30 to 300 chain atoms.

The trunk copolymers must be sufficiently stable to withstand heating during subsequent grafting of the side chain polymer. They should also be free from hydroxyl, primary amino, and secondary amino groups that can react with the amine-reactive sites to form thermostable crosslinks, which would cause a loss of the desired thermoplasticity.

The thermoplastic graft copolymer consists essentially of a trunk copolymer and a side chain polymer or oligomer wherein the trunk copolymer and the side chain polymer are preferably linked through imide linkages. The vicinal carboxylic acid groups allow formation of an imide when treated with the primary amine of the side chain polymer. When the trunk polymer is a terpolymer with an additional comonomer such as an alkyl acrylate or methacrylate, the primary amine of the side chain polymer may, depending on reaction conditions, alternatively/additionally react with the ester to provide an amide linkage.

The graft copolymers can be prepared in various ways. Convenient ways include (1) the anhydride route, for use with ethylene/maleic anhydride and other anhydride-containing trunk copolymers, and (2) the vicinal acid-acid or acid-ester route, for use with trunk copolymers having diacid or monoester of vicinal dicarboxylic acid substituents, respectively.

The anhydride route involves simply heating together with mixing the trunk copolymer having carboxylic anhydride groups, preferably maleic anhydride, and the amino-containing side chain polymer in the molten state, at a temperature from 75 to 250° C., such as about 225° C., or in solution at a temperature of 75 to 100° C. or higher. The heating temperature is above the melting point of the trunk copolymer and the amino polymer. The time of reaction, which is dependent upon the temperature and rate of mixing, can vary from about 15 seconds to 60 minutes in the melt, preferably 1 to 10 minutes. Reaction in the melt, an especially preferred procedure, can conveniently be carried out on a roll mill, in a melt extruder, or in internal mixers having convoluted rollers, sigma blades, etc., using a temperature that will give short reaction time and as many passes as necessary to insure complete reaction. Completeness of reaction can be judged by the appearance of the product, good clarity in the melt indicating essentially complete reaction. With a roll mill as the reactor, the trunk copolymer and side-chain polymer can be premixed or mixed during reaction on the mill; and because of the exposure it may be desirable to include stabilizing agents such as inhibitors or antioxidants, or to carry out the operation in a protective atmosphere such as nitrogen. With an extruder as the reactor, premixing as a dry blend is desirable.

The vicinal acid-ester route can also be carried out in the melt for reaction times similar to, but generally slower than, those for the anhydride route described above. The vicinal acid-ester route may be conducted in the same way as that described above for the anhydride route, carried out on a roll mill or in an extruder. Reaction between the polyetheramine and an EMAME copolymer proceeds well to high conversion, if the polar polyetheramine is effectively mixed with the non-polar EMAME for reaction.

The graft copolymer is believed to be obtained by attachment of the amine side chain to the backbone copolymer through imide linkages (with elimination of alcohol) which may be derived through intermediate formation of amic acids, or by prior conversion of the vicinal acid-ester by loss of alcohol to an anhydride and reaction of the latter with the amino oligomer as described above. The graft copolymer product can be characterized by several techniques, which show the presence of imide-linked side chains, the degree of polymerization of the side chains, and the chemical identity of the side chains, to name a few. Certain physical characteristics often are also helpful to show that a graft copolymer has been obtained.

Additional details of the reactions linking the trunk copolymer and the side chain polymer and means of characterizing the graft copolymer may be found in U.S. Pat. Nos. 3,972,961 and RE 30,754.

The process allows for control of the type and length of the polymer side chain grafted onto the trunk copolymer. From the specific type of trunk copolymer the average frequency of possible reactive graft sites can be readily determined by the fraction, e.g., on a molar basis, of monomer molecules providing the reactive sites which are polymerized into the trunk copolymer. Since the polymeric side chains are preformed prior to reacting with reactive sites on the trunk copolymer excellent control of the graft copolymer is achieved. The resultant thermoplastic graft copolymer is relatively uncontaminated with ungrafted side chain polymer, which may be a major problem in conventional free radical graft polymerization.

Incorporation of up to 20 weight % of Jeffamine M-600 or 35 weight % of Jeffamine M-1000 into an EMAME copolymer may be possible. The amount of possible polyetheramine incorporation increases for an EMAME copolymer with higher MAME content. An average of at least about three polyether segments grafted onto each EMAME polymer backbone is preferable.

Notably, the ethylene graft copolymer has a ratio of the mole % of polyetheramine added divided by the mole % of the comonomer providing an amine-reactive site in the starting trunk copolymer of about 0.1 to about 0.9, or from about 0.2 to about 0.8, or from about 0.3 to about 0.7.

The graft copolymer based on the reaction of EMAME and polyetheramine may have the ratio of the weight of polyetheramine added divided by the molecular weight of the polyetheramine versus the weight % of MAME in the starting EMAME copolymer divided by 144 of about 0.1 to about 0.9. For example, for 100 grams of EMAME (10 weight % of MAME), polyetheramine with a MW of 1000 would be incorporated into the polymer in the range of 6.9 grams to 62.5 grams. A preferred range is 0.2 to 0.8.

The advantage of this process in providing control of the side chain polymers is illustrated as follows. To provide improved properties at elevated temperatures, it may be desirable to have the side chain polymers of sufficient length so that these side chains can crystallize. For another use, it may be important that the side chain is not long enough to provide a substantial amount of crystallization at room temperature.

The graft copolymer can be prepared and then blended with an optional polymer resin described below by standard blending procedures. Blending in the melt can conveniently be carried out on a roll mill, in a melt extruder, or in internal mixers having convoluted rollers, sigma blades, etc.

Preferably, the grafting of the side chain polymer to the trunk polymer and the blending with the optional resin can be conducted in a single operation, provided the optional resin does not react with the side chain polymer. Notably, the method comprises (1) providing a trunk copolymer as described above; (2) providing a short chain polymer as described above; (3) providing an optional resin as described below; and (4) heating and mixing for about 15 seconds to 60 minutes the trunk polymer, the short chain polymer and the optional polymer, to provide a blend of the ethylene graft copolymer comprising polyetherimide segments and the optional polymer.

The blending and grafting may be conducted using a roll mill, in a melt extruder, or in internal mixers having convoluted rollers, sigma blades, etc, preferably using an extruder. For example, pellets of the base resin, trunk polymer and side chain polymer may be pre-blended to provide a salt-and-pepper blend of the three components and then melt blended in an extruder. During the extrusion, the trunk polymer and the side chain polymer can react to form the graft copolymer. Alternatively, the components may be fed from separate hoppers into the extruder to be blended and grafted.

The selectively permeable composition may further comprise an optional polymer resin that may include polyethylene homopolymers, polyethylene copolymers, polypropylene homopolymers or polypropylene copolymers. Including polyolefins such as polyethylene and/or polypropylene may provide balanced properties such as including polyethylene or polypropylene, which may provide lower cost and/or improved adhesion to low polarity materials without significantly reducing the moisture permeability properties of the blend. Inclusion of polypropylene may also provide for higher usage temperatures.

"Polyethylene" includes low density polyethylene, linear low density polyethylene, high density polyethylene or metallocene polyethylene. An ethylene-based polymer suitable as a polymeric material that can be used as the surface layer can be an ethylene homopolymer or a copolymer of ethylene and α-olefin having three or more (preferably from 3 to 12) carbon atoms that is manufactured in the presence of a metallocene catalyst (see for example U.S. Pat. Nos. 5,198,401 and 5,405,922).

Examples of the α-olefin having three or more carbon atoms in the aforementioned ethylene copolymer include propylene, 1-butene, 1-pentene, 1-hexene, 1-octene, 1-decene, 1-dodecene, 4-methyl-1-pentene, etc. In particular, a copolymer of ethylene and an α-olefin having from 3 to 12 carbon atoms is preferably used. In some cases, more than one α-olefin may be present in a mixture that can be copolymerized with ethylene.

As the polymer or copolymer of ethylene manufactured in the presence of a metallocene catalyst, those with various densities may be employed depending upon the α-olefin content in the copolymer. In general, however, it is preferable to use an ethylene copolymer having a density of from about 870 to about 970 kg/m$^3$, particularly from about 890 to about 950 kg/m$^3$, and especially from about 900 to about 940 kg/m$^3$. When processability and practical physical properties are taken into consideration, preferred is the use of a polymer having a melt flow rate, measured at 190° C. and 2160 g load, of from about 0.1 to about 100 g/10 minutes, preferably from about 0.2 to about 50 g/10 minutes.

Polar Ethylene Copolymers

Compositions of this invention may comprise an additional resin that may include at least one copolymer obtained from copolymerization of ethylene with a polar monomer (that is, a polar ethylene copolymer). Inclusion of polar ethylene copolymers may provide improved improved adhesion to polar materials. The optional polymer(s) can be present in amounts up to about 69 weight % of the base resin of, so long as they do not detract from the basic and novel characteristics of the composition and do not significantly adversely affect the desirable performance characteristics, such as high temperature resistance, adhesive properties or optical clarity of the composition.

Preferably, the ethylene copolymer comprises ethylene/vinyl acetate copolymers, ethylene/alkyl (meth)acrylate copolymers and ethylene/(meth)acrylate/carbon monoxide terpolymers and/or mixtures of any of these. Ethylene (meth)acrylate copolymers include ethylene acrylic ester copolymers and ethylene methacrylic ester copolymers.

Combinations of two or more different polar ethylene copolymers may be suitable. For example, combinations of two or more polar ethylene copolymers with different polar comonomers can be suitable, as can be combinations of two or more polar ethylene copolymers having identical monomers but with different amounts of said monomers.

Ethylene/Vinyl Acetate Copolymers

A composition of this invention may comprise at least one ethylene/vinyl acetate copolymer (an EVA copolymer), or blends thereof.

The weight percentage of vinyl acetate monomer incorporated into an EVA copolymer suitable for use herein can vary from about 2 weight percent up to about 45 weight percent or greater, based on the total weight of the copolymer. The amount of vinyl acetate can be varied to obtain a desirable degree of polarity sought for the blended composition.

The ethylene/vinyl acetate copolymer preferably has a vinyl acetate unit content of from about 6 to about 40% by weight, or from a lower limit of about 6, about 12, or about 15 weight % to an upper limit of about 20, or about 30 or about 40 weight %. The ethylene/vinyl acetate copolymer may optionally be modified by methods well known in the art, including modification with an unsaturated carboxylic acid or its derivatives, such as maleic anhydride or maleic acid. The ethylene/vinyl acetate copolymer preferably has a melt index, measured in accordance with ASTM D 1238 at 190° C., of from about 1 to about 800 g/10 minutes or from about 1 to about 400 g/10 minutes, more preferably from about 1 to about 100 g/10 minutes.

Ethylene/vinyl acetate copolymers suitable for use in this invention include those available from E. I. du Pont de Nemours & Co. (DuPont), Wilmington, Del. under the Elvax® tradename.

A mixture of two or more different ethylene/vinyl acetate copolymers can be used in the compositions for this invention in place of a single copolymer as long as the average values for the comonomer content will be within the range indicated above. Particularly useful properties may be obtained when two or more properly selected ethylene/vinyl acetate copolymers are used in blends of this invention.

Ethylene/Alkyl Acrylate Copolymers

As used herein, ethylene/alkyl (meth)acrylate copolymers include copolymers of ethylene and alkyl acrylates or alkyl methacrylates wherein the alkyl moiety contains from one to 20, preferably one to six carbon atoms. Examples of alkyl acrylates include methyl acrylate, ethyl acrylate and butyl acrylate and examples of alkyl methacrylates include methyl methacrylate, ethyl methacrylate and butyl methacrylate. "Ethylene/methyl acrylate" (EMA) means a copolymer of ethylene and methyl acrylate. "Ethylene/ethyl acrylate" (EEA) means a copolymer of ethylene and ethyl acrylate. "Ethylene/butyl acrylate" (EBA) means a copolymer of ethylene and butylacrylate. Of note are ethylene/butyl acrylate copolymers prepared from i-butyl acrylate comonomers (EiBA) and ethylene/butyl acrylate copolymers prepared from n-butyl acrylate comonomers (EnBA).

The relative amount of the alkyl (meth)acrylate comonomer incorporated into ethylene/alkyl (meth)acrylate copolymer can, in principle, vary broadly from a few weight percent up to as high as 40 weight percent of the total copolymer or even higher, such as from about 6 to about 40% by weight, or from a lower limit of about 6, about 12, or about 15 weight % to an upper limit of about 20, or about 30 or about 40 weight %. Similarly, the alkyl group can comprise from 1-carbon to 6-carbon groups, that is to say the alkyl group can vary from a methyl group up to and inclusive of branched and/or unbranched propyl, butyl, pentyl, and hexyl groups. The relative amount and choice of the alkyl group present in the alkyl (meth)acrylate ester comonomer can be used to manipulate the polarity of the composition. Preferably, the alkyl group in the alkyl (meth) acrylate comonomer has from one to four carbon atoms.

The ethylene/alkyl (meth)acrylate copolymer preferably has a melt index, measured in accordance with ASTM D 1238 at 190° C., of from about 1 to about 800 g/10 minutes or from about 1 to about 400 g/10 minutes, more preferably from about 1 to about 100 g/10 minutes. Of note is an ethylene/methyl acrylate copolymer comprising 20 weight % methyl acrylate with an MI of 8 g/10 min.

Ethylene/alkyl (meth)acrylate copolymers can be prepared by processes well known in the polymer art using either autoclave or tubular reactors. The copolymerization can be run as a continuous process in a stirred high-temperature and high-pressure autoclave reactor. For example, ethylene, the alkyl acrylate, and optionally a solvent such as methanol (U.S. Pat. No. 5,028,674) are fed continuously into a stirred autoclave such as the type disclosed in U.S. Pat. No. 2,897,183, together with an initiator. Preferably, the ethylene copolymer is of the type that is prepared in a high pressure, tubular reactor according to the procedure described in the article "High Flexibility EMA Made from High Pressure Tubular Process" (Annual Technical Conference-Society of Plastics Engineers (2002), 60th (Vol. 2), 1832-1836). The ethylene copolymer is obtained in a tubular reactor at elevated temperature with additional introduction of reactant comonomer along the tube. However, it should be appreciated that similar ethylene/alkyl acrylate copolymeric material can be produced in a series of autoclave reactors wherein comonomer replacement is achieved by multiple zone introduction of reactant comonomer as taught in U.S. Pat. Nos. 3,350,372; 3,756,996; and 5,532,066, and as such these high melting point materials should be considered equivalent for purposes of this invention.

Ethylene/alkyl acrylate copolymers suitable for use in this invention include those available from DuPont under the Elvaloy® AC tradename.

Mixtures of two or more ethylene/alkyl (meth)acrylate copolymers are contemplated as within the scope of this invention.

The composition can further comprise a fire retardant such as a chemical additive including, but not limited to, phosphorous compounds, antimony oxides, and halogen compounds, particularly bromine compounds, and others well known in the art. A loading of such additives can be between 20 to 30, or about 25% (of the final air-dried composition or air-dried film weight).

The composition may also comprise fillers, fibers, or pulps in added quantities that may be up to 30 to 40 weight % of the total composition. These materials may provide reinforcement or otherwise modify the mechanical properties of the composition, without negatively impacting the selective permeability of the composition. Fillers include, for example, inorganic materials such as carbon black, $TiO_2$, calcium carbonate ($CaCO_3$). Fibers, including chopped fibers, include glass fibers, aramid fibers, carbon fibers and the like. Pulps include, for example aramid micropulps (micropulp has a volume average length from about 0.01 to about 100 micro-meters).

The polymer composition can be formed or incorporated into a film or sheet. Films may be made by known techniques such as casting the polymer composition onto a flat surface or into a film, extruding the molten polymer composition through an extruder to form a cast film, or extruding and blowing the polymer composition film to form an extruded blown film.

The films may have a thickness of from 1 to 2500 μm, with the preferred thickness for many protective cover applications being about 5 to 10 mils thick, or about 120 to 250 μm thick.

The protective structures can be in the form of, for example, tarpaulins, covers, garments and the like. The membrane from the composition can be present as a layer of material added to the protective structure, or as one component of a fabric incorporated into the protective structure. Generally, a layer of the composition and a supporting substrate, as described in greater detail below, may be arranged in overlaying or overlapping fashion to provide a protective structure. When used with a substrate, the selectively permeable composition may have a thickness from about 10 to about 250 μm. The membrane composition can be converted and applied to a substrate by a variety of techniques and processes.

The composition may be applied to a substrate in molten condition by, for example but not limitation, extrusion coating to a substrate or lamination of two substrate layers by means of an inner layer of the composition applied in molten form to adhere the substrates together. In some embodiments the polymer composition can be coated directly on a substrate utilizing fabric impregnation and coating techniques. For example, the selectively permeable composition is a coating applied directly on the substrate (via extrusion coating, spraying, painting or other appropriate application methods). Such coating can be applied using spreading methods known in the art such as with a rubber doctor blade or with a slit extrusion machine.

The composition can be applied to one side or both sides of a textile substrate. In the case where the substrate is coated or laminated on one side, the composition may be applied to the side that is directly exposed to the environment to provide a liquid-impermeable outer surface. Alternatively, in applications where mechanical wear or abrasion is likely, the composition may be applied to the side of the textile substrate opposite the side exposed to the mechanical wear to afford protection of the polymeric composition.

In other embodiments the composition can be impregnated in a substrate or the substrate can be impregnated in the polymer.

The selectively permeable composition may be formed at least partially in the substrate by impregnating the substrate with the composition by applying the molten composition to the substrate and then cooling the composition while it is in contact with the pores of the substrate.

The composition can be dispersed throughout the substrate such as a loosely woven fabric where the composition fills gaps in the substrate and does not just adhere on the surface of a substrate. The substrate can be impregnated inside the selectively permeable membrane through lamination or coextrusion process to have the permeable compositions on both sides of the substrate.

The composition can also be accommodated between two layers of textiles in a sandwich-like manner. Several layer assemblies can also be assembled one above the other. For example, the configuration can comprise the selectively permeable membrane layer, a substrate layer, another selectively permeable membrane layer, another substrate layer, and so on, depending upon desired applications of the protective structure. Other configurations can comprise variations of the aforementioned sandwich configuration, including a plurality of selectively permeable membrane layers, a plurality of substrate layers, and so forth, including mixtures thereof.

The membrane from the composition can be present as a layer of material added to the protective structure, or as one component of a fabric incorporated into the protective structure. Coated fabrics, used previously as tarpaulins or other covers, may have at least one wear resistant outer layer that generally needs high flexibility, high resistance to marring from wear, abrasion, scuffing, and scratching, high mechanical strength and toughness. Coating compositions preferably exhibit good adhesion to fabrics and other substrates such as plastic films and cellulosic materials such as paper or paperboard. They also desirably exhibit good melt processability, good colorability, good printability, and high transparency and/or gloss. Previous coating compositions for these applications include plasticized or flexible polyvinyl chloride. The composition described herein provides a superior coating composition to previous coating materials because it is selectively permeable.

The composition can be in the form of a film or sheet and the film is mechanically held or fastened in overlaying fashion adjacent to the textile. Mechanical fastening includes the use of fasteners such as snaps, zippers, hook-and-loop fasteners and the like. Mechanical fastening also includes stitching or quilting using threads or fibers.

The selectively permeable membrane may be attached or adhered to the substrate by use of a compatible adhesive placed between the membrane layer and the substrate. To maintain water vapor permeability of the structure, in some embodiments the adhesive is present as a discontinuous layer between the membrane layer and the substrate, and in many cases, it may be applied as a series of adhesive dots that cover for example about 10 to about 40 percent of the substrate surface. The adhesive also may be applied selectively near the edges of the membrane and the substrate.

The selectively permeable membrane may also be attached to the substrate by heat sealing or high frequency (HF) welding. The laminate can be heat sealed (thermally bonded) using any known method, included heated presses and calenders and the like, or by applying heat to the layers and then subsequently pressing them together without additional heat. In each case, the softened layer or component subsequently bonds the film structure to the substrate. In either heat sealing or HF welding, the bonding of the film to the substrate may be continuous across the entire area of the film and substrate or it may be discontinuous. Discontinuous bonding may be accomplished by application of heat or HF radiation to selected portions of the area where the film overlays the substrate.

A selectively permeable composition as described herein can be prepared as a powder with granular sizes of up to 600, alternatively up to 400, alternatively up to 200, μm in size. A powder composition can comprise granules that vary in size from about 100 to about 600 μm. The average particle size in a powder composition can be from about 150 to about 200 μm. The compositions can be milled, pulverized or otherwise processed by methods known in the art to provide a desired particle size suitable for application to a substrate.

The powder can be applied to a substrate by a technique such as powder scattering, wherein the powder is evenly distributed across a working width of a substrate and thereafter melted, smoothed, and cooled to provide a uniform coating of the composition on the substrate.

The laminate can further comprise a layer of adhesion-promoting or contaminant blocking substance that is selectively permeable, which could also be an abrasion resistant polymer, positioned adjacent to the selectively permeable layer. For example, this substance may contain urethane functionality and can be about 2.5 to 12 μm thick. Other polymers that can be used in this layer include a variety of elastomers, reactive materials, and adhesives. Preferably the adhesion promoting polymer layer is present as a film, however, the layer can be a coating or an impregnation of the substrate. This additional adhesion promoting polymer layer is especially useful when the laminate is made by combining the layers of the laminate by thermal pressing, bonding, calendaring and the like. In this case, the layer of abrasion resistant polymer is preferably compatible with the selectively permeable layer so that when the items are thermally pressed they adhere together.

The substrate may be any material providing support, shape, esthetic effect, protection, surface texture, bulk volume, weight, or combinations of two or more thereof to enhance the functionality and handability of the structure.

A substrate can be a vehicle to aid in incorporating the selectively permeable composition or provide mechanical support for the membrane so that permeability is not hindered. Preferably a substrate has water vapor diffusion that is greater than the water vapor diffusion of the selectively permeable membrane so that the water vapor diffusion characteristics of the structure are essentially provided by the selectively permeable composition. That is, the substrate does not substantially affect the passage of water vapor through the layered structure, and for example, may have a measured MVTR of at least 1.8, 4, 5, or even 10, Kg/m$^2$/24 hours.

Any support or substrate meeting these desired characteristics may be used with the selectively permeable composition. Examples include a textile or porous sheet material. Sheets made from synthetic fiber spun fabrics, such as nonwoven textiles, may be used as a textile substrate. Cloth that is woven, knitted or the like is also suitable as a textile substrate. A fabric may comprise flame retardant(s), filler(s), or additive(s) disclosed above.

For example, a fabric may comprise a 50% nylon-50% cotton blend woven fabric (also known as NYCO) such as those by Bradford Dyeing Association, Inc., in Bradford, R.I. A fabric of note is a polyester woven fabric from Millikin and Company (Spartanburg, S.C.).

While the substrate has been described generally as a textile, the substrate can be any other material that is capable of accommodating thereon one or a plurality of layers or accommodating therein a dispersion of the selectively permeable composition.

Cellulosic materials such as paper webs (for example Kraft or rice paper), materials made from synthetic fiber spun fabrics, nonwoven textiles, microporous films, or even perforated films having large percentages of open areas such as perforated PE films, may be used as materials for the substrate(s), for example. These materials may be reinforced with fibers. Microporous films of note may be prepared from polypropylene, polyethylene or combinations thereof. They may be monolayer or multilayer films (for example, three-layer films comprising an inner layer of polypropylene between two outer layers of polyethylene). Microporous films are available from Celgard, LLC, Charlotte, N.C. under the CELGARD tradename.

Suitable polymers for a microporous film are (1) linear ultrahigh molecular weight polyethylene having an intrinsic viscosity of at least 18, preferably 18 to 39, deciliters/gram, (2) linear ultrahigh molecular weight polypropylene having an intrinsic viscosity of at least 6 deciliters/gram, and (3) mixtures of (1) and (2).

The microporous film may include a finely divided, particulate, substantially water-insoluble, inorganic filler, for example a siliceous filler, which is distributed throughout the matrix and which is present in amount 50 to 90%, particularly 50 to 85%, by weight of the film. The filler may be silica, precipitated silica, or silica having an average ultimate particle size of less than 0.1 μm and may occupy 35 to 80% of the total volume of microporous film. Because they have a relatively narrow range of pore sizes, films may be made by extruding a polymeric composition which contains an inorganic filler and a processing oil, e.g. a paraffinic oil, naphthenic oil or aromatic oil, uniformly distributed therein; followed by extraction of the processing oil, e.g. with trichloroethylene. Some films are disclosed, for example, in U.S. Pat. Nos. 4,937,115 and 3,351,495 and films are sold by PPG Industries under the tradename TESLIN.

Specific examples of porous or perforated films include a porous PE film having a porosity of about 55% and a pore size of about 0.25 microns, available under the tradename CELGARD K878 from Hoechst Celanese Corp; a porous PE film available under the tradename MSX 1137P from 3M Co.; and a filled porous PE film available under the designation Van Leer 10X from Van Leer Corp. TESLIN SP7 is a filled porous PE films containing about 60% silica, having a thickness of about 0.18 mm (0.007 inch), a tear strength measured as described above of about 90 g, a porosity of about 65%, an average pore size of about 0.1 micron and a largest pore size of 4 to 10 microns. TESLIN X457 is similar to TESLIN SP7 but is more porous. TESLIN SP10 is similar to TESLIN SP7 but has a thickness of about 0.25 mm (0.010 inch). All three TESLIN films are available from PPG Industries. A perforated high density polyethylene film, 0.11 mm (4.5 mil) thick, with an open area of about 36%, is available under the tradename DELNET from Applied Extrusion Technologies.

A substrate can be a porous sheet material comprising a fluoropolymer. A substrate can be sheet material made with expanded polytetrafluoroethylene that is available from many companies, including W. L. Gore & Associates of Wilmington, Del. Other porous substrates include porous or microporous polyurethane films, certain flash spun nonwoven fabrics, such as flash spun polypropylene, and other spun bonded polymer fabrics, filter materials from companies such as Millipore, nano- or micro-fiber structures, natural or synthetic fibers, other related supports that add dimensional stability, or combinations of two or more thereof.

The protective structure may further comprise other layers such as adhesive layers, thermal insulation layers, cushioning layers, absorptive layers, reactive layers, and the like.

Insulation layers and cushioning layers may comprise an organic thermoplastic fiber-based material comprising, e.g., polyester, polyethylene or polypropylene. For example, the thermal insulating or cushioning layer is a fiberfill batt comprising polyester. A fiberfill batt sold as THERMOLITE ACTIVE ORIGINAL by DuPont is suitable. Alternatively, the thermal insulating layer may comprise melt-blown fibers, such as melt-blown polyolefins, sold as THINSULATE, by 3M. They may also include other materials such as fiberglass bans.

The mechanical properties and ease of processing of the selectively permeable composition, and its ability to transport water vapor and block liquids, optionally combined with a support substrate render protective structures thereof applicable for covering or enclosing articles during transport and storage. The structure so made is also referred to as selectively permeable membrane or structure. The mechanical properties and ease of processing of the selectively permeable structure, and its ability to transport water and block organic molecules, combined with a support substrate render protective structures thereof applicable for various applications, such as, for example, chemical and/or biological protective clothing for health care or military applications. Examples include chemical and/or biological protective apparel comprising any of the aforementioned various embodiments of the selectively permeable protective structure. A biological barrier is any structure that provides resistance to harmful or undesirable biological agents such as bacteria, microbes, viruses and the like that, for example, may be present in blood, sera, and other bodily fluids or may be present as aerosols.

The protective structure can be used in protective garments such as for health care applications including gowns and other apparel for operating room, patient visitor, medical, dental, and similar applications. The apparel can be selected, for example, from the group consisting of gowns, aprons, shirts, trousers, overcoats, gloves, shoes, boots, overboots, socks, hoods, hats, caps, masks, and eye goggles. Other health care equipment can be selected, for example, from the group consisting of screens, drapes, and breathable dressings.

Protective garments may also be used in food preparation, transportation, industrial and manufacturing procedures or other applications that require protection from biological and/or chemical agents, heat, irritants and the like. The unique properties of the selectively permeable structure are useful for applications including protective clothing for "first responders" in chemical threat situations, or for hazardous materials handling. In addition to apparel listed above for health care applications, protective apparel may also include helmets and gas masks.

The selectively permeable protective structure may also be suitable for fabrics used in responding to biological and/or chemical spills. It may be used for fabrics for tents, awnings and other shelters. These uses may be protective, since they block transmission of the agent from one place to another.

Other uses for the selectively permeable structure include covering objects during transportation and storage to provide protection from liquid water while allowing water vapor to permeate out of the enclosed space, preventing a buildup of moisture inside the enclosed space, thereby reducing the possibility of corrosion, mold growth and other deleterious effects resulting from excess moisture.

A variety of structural configurations may be used to produce the covering or package. For example, the variably permeable multilayer structure may be in the form of a flexible sheet of material. The sheet material may be wrapped around an article to be protected from corrosion in the same way conventional plastic films are used. Some structural configurations are as follows.

(1) Films or sheets of material comprising the selectively permeable structure that may be wrapped around or draped over the object(s) being packaged.

For example, the object, which may be a piece of equipment or a pallet and its load, may be wrapped in overlapping layers of film that may be applied by machine or by hand. These films may be relatively long and narrow and dispensed from rolls. The film may be stretchable or heat shrinkable. Wrapping an object with a linear stretch wrapping film by a machine, for example may be done by placing the object on a turntable and rotating it as the film is fed horizontally and its position is varied vertically to wrap the object in overlapping layers. The film may also be applied manually, as by an operator with a hand-held film dispenser who walks around the loaded pallet until a sufficient amount of film is applied.

A heat shrinkable film can be wrapped around an object and heat applied to it so that it shrinks to conform tightly around the object.

Other examples include substantially flat rectangular sheets having similar length and width that may be draped and optionally mechanically fastened in place (for example, with straps, ropes, elastic bands or the like) over the object, such as tarpaulins and the like.

These package forms may be preferred when a large variety of objects of different size and shape are to be packaged at a given time or location.

(2) Bags, pouches, hoods or sheathes comprised completely of the selectively permeable structure described herein or which comprise other materials such as other polymeric materials, woven or nonwoven textiles and the like and have windows, patches or areas thereon which comprise the selectively permeable structure.

These packaging forms are prepared from sheets or films that are formed into a concave shape that can accommodate the object to be packaged.

They include heat shrinkable hoods and pallet stretch hoods. Pallet stretch hoods are elastic sheaths that are stretched to fit over a pallet and its load. The pallet stretch hood then contracts, due to its elastic properties, and the forces of contraction provide integrity and stability to the loaded pallet.

These package forms may be preferred when a large number of objects of similar size and shape are to be packaged at a given time or location.

(3) Rigid or semi-rigid or flexible structures such as tubs, boxes, bins and the like, comprised completely of the selectively permeable structure or comprised in part of other materials having one or more windows of the variably permeable multilayer structure thereon.

(4) Lidding material comprised completely of the selectively permeable structure or comprised in part of other materials having one or more windows of the selectively permeable structure thereon. The lidding material may be used in combination with rigid or semi-rigid or flexible structures such as tubs, boxes, bins and the like to prepare a package comprising the selectively permeable structure.

(5) Patches of the selectively permeable structure over designed openings of packages to provide the desired permeability.

(6) Packages in which the selectively permeable structure is covered by a removable protective cover that allows a user to expose the selectively permeable structure to the environment at an appropriate time. For example, the protective cover may comprise a material with low adhesion to the selectively permeable structure that may be peeled away from the surface of the selectively permeable structure when desired. Alternatively, the cover may be removable material that overlays the selectively permeable structure, but is not adhered to it, in a package. For example, the protective cover may be a lid, flap or patch of protective (such as barrier) material that may be removed when desired. The protective cover may also be placed over a patch or window of the selectively permeable structure in a package.

This form of protective cover may provide extra protection of equipment during rain or other inclement weather, after which the barrier flap is removed to allow for moisture to vent through the selectively permeable membrane.

Numerous variations of these structures are also possible and such structures will become apparent to those skilled in the art upon reading this disclosure.

In the method for limiting damage to an article due to corrosion or mold growth, the article can be wrapped or covered in a selectively permeable protective structure disclosed above and the wrapping or covering may or may not be hermetic.

EXAMPLES

Without further elaboration, it is believed that one skilled in the art using the preceding description can utilize this invention to its fullest extent. The following Examples are, therefore, to be construed as merely illustrative, and not limiting of the disclosure in any way whatsoever. The methods for the evaluation of the raw materials used and the performances of the resulting laminates in the following Examples and Comparative Examples are shown below.

Materials Used

PEA-1: a monoamine-terminated polyether with a MW of 1000 and mole ratio between PO and EO of 3/19 obtained from Huntsman as Jeffamine® M-1000.

EMAME-1: a copolymer of 90.5 weight % ethylene and 9.5 weight % MAME, with MI of 30 as measured at 190° C.

EMAME-2: a copolymer of 85 weight % ethylene and 15 weight % MAME, with MI of 40 as measured at 190° C.

EVA-1: a copolymer of ethylene and 25 weight % of vinyl acetate, with MI of 2 as measured at 190° C.

EMA-1: a copolymer of ethylene and 20 weight % of methyl acrylate, with MI of 8 as measured at 190° C.

AOX-1: an antioxidant commercially available from CIBA-Geigy under the tradename Irganox® 1010.

AOX-2: an antioxidant commercially available from CIBA-Geigy under the tradename Irganox® 1098.

LDPE is a low-density polyethylene, available from Alathon under the designation 1640.

Sample Preparation

All samples were made on a 26-mm twin-screw extruder, typically with 180 to 200° C. barrel temperature settings and screw speed of 100 rpm. Polymers, including EMAME-1 or EMAME-2 and optional polymers EMA-1 and LDPE when used, with an antioxidant, were fed at the back end of the extruder, followed by an intense kneading section in the extruder screw to disperse these ingredients. PEA-1, in liquid form was injected into the extruder barrel through a Katron pump with temperature setting at 50° C. after the initial mixing section, and this liquid injection was followed by additional intense mixing elements. The melt strand from the extruder was water quenched and cut into pellets for collection and subsequent evaluation.

Table 2 summarizes the materials prepared by melt blending the components listed as parts by weight. Examples 1 to 8 are blends of EMAME copolymers containing varied amounts of PEA-1 to form graft copolymers.

Table 2 lists two blend examples. Example 9 is a blend of EMAME and EMA-1 (70/30 weight %) with 28 weight % of PEA-1. Antioxidant AOX-1, 0.1 weight %, was included. The sample was produced in a W/P extruder in one step. Example 10 is a blend of 40 weight % of LDPE and 60 weight % of a polyethyleneamine-grafted EMAME. The grafted component of Example 10 was prepared from 100 parts by weight of EMAME-2 and 40 parts by weight of PEA-1 and AOX-2, 0.1 wt. %, prepared separately in a W/P extruder. The graft copolymer had a melting point of 100.7° C. In essence, Example 10 was prepared in two steps by first making the polyetheramine-grafted E/MAME and then blending with LDPE.

performed to determine whether the blown film adhered to the Tyvek®. In all sandwich samples, the Tyvek® was pulled apart into fuzz and threads, which suggested excellent adhesion of the blown film to Tyvek®.

In the Table, "NA" stands for "not available."

TABLE 1

|  | 1 | 2 | 3 | 4 | 5 | 6 | 7 | 8 | 9 | 10 |
|---|---|---|---|---|---|---|---|---|---|---|
| Parts by weight | | | | | | | | | | |
| EMAME-1 |  |  |  |  | 100 | 100 | 100 | 100 | 70 | 43 |
| EMAME-2 | 100 | 100 | 100 | 100 |  |  |  |  |  |  |
| EMA-1 |  |  |  |  |  |  |  |  | 30 |  |
| LDPE |  |  |  |  |  |  |  |  |  | 40 |
| PEA-1 | 30 | 35 | 40 | 45 | 30 | 35 | 40 | 24.5 | 28 | 17 |
| AOX-1 | 0.1 | 0.1 | 0.1 | 0.1 | 0.1 | 0.1 | 0.1 | 0.1 | 0.1 |  |
| AOX-2 |  |  |  |  |  |  |  |  |  | 0.06 |
| Melt Flow Index | 5.9 | 4.3 | 4.7 | 5.3 | 4.5 | 4.2 | 4.2 | 6.7 | 4.0 | 5.0 |
| DSC Melting point (° C.) | 104 | 103 | 103.6 | 103.4 | 106.4 | 105.7 | 106.2 | 108 | 102.5 | 108 |
| Blown Film | | | | | | | | | | |
| Thickness (mil) | 1 | 2.3 | 2.3 | 1.85 | 1.8 | 1.8 | 2.4 | 2.3 | 2.0 | 2.2 |
| MVPV (g-mil/m²-24 h) | | | | | | | | | | |
| dry | 1490 | 3472 | 3018 | 3763 | 2270 | 2732 | 4097 | 2945 | 1865 | 1510 |
| dry | 1705 | 3116 | 2953 | 3863 | 2290 | 3096 | 4506 | 2729 |  |  |
| water treated | 1383 | 2775 | 3610 | 3610 | 1853 | 2560 | 3523 | 2203 |  |  |
| water treated | 1342 | 2560 | 3845 | 3532 | 2010 | 2586 | 3835 | 2160 |  |  |
| adhesion to Tyvek ® | excellent | excellent | excellent | excellent | excellent | excellent | excellent | excellent | excellent | NA |
| Two-layer laminate of the blown film and Tyvek ® | | | | | | | | | | |
| Thickness (mil) | NA | 6.2 | NA | 4.9 | NA | 5.6 | NA | NA | 5.8 | NA |
| MVTR (g/m²-24 h) | NA | 432 | NA | 937 | NA | 875 | NA | NA | 722 | NA |

To illustrate moisture permeance associated with a film layer, blown films were prepared from the materials listed in Table 2. All samples were made into blown films easily. The films, approximately 1 to 3 mils in thickness, were made using a small laboratory scale blown film line.

Two-layer laminates of Tyvek® HomeWrap and selected blown films were prepared by press molded at 120° C. The MVTR of the laminates are reported in Table 1.

The materials were characterized by the following methods.

Melt Index and Melting Point

Melt index (MI) is the mass rate of flow of a polymer through a specified capillary under controlled conditions of temperature and pressure. It was measured according to ASTM 1238 using a 2160 gram weight at 190° C.

Melting points of the samples were measured using a differential scanning calorimetry (DSC). All samples showed a melting point at about 103 to 108° C. Thus, the samples all have good temperature resistance, which is important when the materials are to be used as a roof membrane.

Moisture Vapor Permeation Values and Moisture Vapor Transmission Rate

The water vapor transmission tests were conducted on a Mocon PERMATRAN-W 101K, following ASTM D6701-01, at 37.8° C. at 100% relative humidity. Moisture vapor permeation values (MVPV) on single layer film samples are reported in g-mil/m²-24 h while MVTR on laminates are reported in g/m²-24 h.

Adhesion to Nonwoven Substrate

The blown films were sandwiched between Tyvek® HomeWrap and press molded at 120° C. A T-peel test was The MVPV data of the "dry" blown films are included in Table 2. The compositions all had MVPV of greater than 1000 g-mil/m²/24 h.

The MVPR data of the blown films after water treatment are also included. The films were immersed in water at room temperature for 48 hours, and then the wet films were air dried.

In comparison between the MVPV of the "dry" control and the water treated film, there was little difference noticed. This suggests that the moisture permeation of the films is quite stable after RH % variation.

Another method for determining material "breathability," or evaporative resistance, uses a Guarded Sweating Hotplate Test according to ASTM F1868, ISO 11092.

Moisture Vapor Transmission Rate (MVTR) of Multilayer Structure

This is measured by a method derived from the Inverted Cup method of MVTR measurement [ASTM E 96 Procedure BW, Standard Test Methods for Water Vapor Transmission of Fabrics (ASTM 1999)]. A vessel with an opening on top is charged with water and the opening is covered first with a moisture vapor permeable (liquid impermeable) layer of expanded-PTFE film ("ePTFE"), and then with the sample for which the MVTR is to be measured, and finally by woven fabric overlayer [NYCO 50:50 nylon/cotton blend, 6.7 oz/yd² (0.23 kg/m²) treated with durable water repellant finish]. The three layers are sealed in place, inverted for 30 minutes to condition the layers, weighed to the nearest 0.001 g, and then contacted with a dry stream of nitrogen while inverted. After 19 h at 23° C., the sample is reweighed and the MVTR calculated (kg/m²·24 h) by means of the following equation:

$$MVTR = 1/[(1/MVTR_{obs}) - (1/MVTR_{mb})]$$

where $MVTR_{obs}$ is the observed MVTR of the experiment and $MVTR_{mb}$ is the MVTR of the ePTFE moisture barrier (measured separately). The values are the average of results from three replicate samples.

The invention claimed is:

1. A selectively permeable structure or article comprising a selectively permeable composition comprising
   (a) a copolymer comprising copolymerized units of ethylene and copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer, wherein the amine-reactive site is present in the copolymer in an amount of from 3 to 25 weight %; and
   (b) a short chain polymer having from about 5 to 50 repeat units and containing one primary amine active amine site, the remainder of the side chain polymer being substantially unreactive with the amine-reactive sites of the copolymer of (a) and comprising propylene oxide, ethylene oxide, or mixture thereof, in an amount of about 20 to about 50 parts by weight per 100 parts by weight of (a); and
   substrate wherein the substrate or a portion thereof is coextruded, impregnated, incorporated, laminated embedded or coated with the composition.

2. The article of claim 1 wherein the composition comprises an ethylene graft copolymer comprising polyetherimide segments, wherein the ethylene graft copolymer comprises a trunk copolymer comprising copolymerized units of ethylene, copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer; and at least one type side chain polymer linked to said reactive sites through imide linkages, said side chain polymer being derived from a short chain polymer having from about 5 to 50 repeat units and containing one primary amine active amine site, the remainder of the side chain polymer being substantially unreactive with the amine-reactive sites of the trunk copolymer and comprising propylene oxide, ethylene oxide, or mixture thereof.

3. The article of claim 1 wherein the selectively permeable composition further comprises (c) an additional polymer present in an amount of about 10 to about 50 weight % of the combination of (a), (b) and (c), wherein the additional polymer comprises polyethylene homopolymers, polyethylene copolymers, polypropylene homopolymers or polypropylene copolymers; or at least one ethylene copolymer comprising copolymerized units of ethylene and copolymerized units of a polar comonomer selected from vinyl acetate, alkyl methacrylate, alkyl acrylate, carbon monoxide or mixtures thereof, wherein said polar comonomer is present in the copolymer in an amount from about 6 to about 40 weight %.

4. The article of claim 1 wherein the article is selectively permeable to moisture having a moisture vapor transmission rate, measured according to ASTM F2298, of at least 1000 g/m2/24 h.

5. The article of claim 1 wherein the article has moisture vapor transmission rate of at least 4 Kg/m2/24 hours.

6. The article of claim 1 wherein the substrate comprises textile or porous sheet material; and the substrate is coated with the composition.

7. The article of claim 1 wherein the composition provides a monolithic or continuous membrane and the substrate is porous film, flash spun nonwoven fabric, woven fabric of synthetic fiber, natural fiber, scrim, paper, filter material, or combinations of two or more thereof.

8. The article of claim 1 wherein the substrate is flash spun nonwoven fabric comprising polyethylene, polypropylene, polyester or combinations thereof, woven fabrics of synthetic fibers, natural fiber, or combinations of two or more thereof.

9. The article of claim 1 further comprising a layer including fabrics of aramid, glass fiber, or combinations thereof.

10. The article of claim 1 wherein the article is fabric, apparel, garment or covering, or combinations of two or more thereof and the garment or the covering is for a hospital patient visitor, hospital operating room, medical application, or dental application.

11. The article of claim 1 further comprising a layer including fabrics of aramid, glass fiber, or combinations thereof and the substrate optionally comprises one or more apertures, voids, or gaps throughout which the composition is dispersed.

12. The article of claim 1 wherein the article provides a protective article used in protection from a biological agent, chemical agent, irritant, or combinations of two or more thereof.

13. The article of claim 1 wherein the article includes one or more gowns, aprons, shirts, trousers, overcoats, gloves, shoes, boots, overboots, socks, hoods, hats, caps, masks, eye goggles, drapes, tents, shelters, tarpaulins, helmets, breathable dressings, films, sheets, bags, pouches, sheathes, tubs, boxes, bins, lidding material, or packages.

14. A method for providing personal protection from exposure to harmful chemical and biological agents using an article that provides a barrier to such agents, the article comprising a selectively permeable structure according to claim 1.

15. The method of claim 14 wherein the article includes one or more gowns, aprons, shirts, trousers, overcoats, gloves, shoes, boots, overboots, socks, hoods, hats, caps, masks, eye goggles, drapes, tents, shelters, tarpaulins, helmets, breathable dressings, films, sheets, bags, pouches, sheathes, tubs, boxes, bins, lidding material, or packages.

16. A method for limiting damage to an article due to corrosion or mold growth, comprising wrapping or covering the article in a selectively permeable protective structure comprising a selectively permeable composition comprising
   (a) a copolymer comprising copolymerized units of ethylene and copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer, wherein the amine-reactive site is present in the copolymer in an amount of from 3 to 25 weight %; and (b) a short chain polymer having from about 5 to 50 repeat units and containing one primary amine active amine site, the remainder of the side chain polymer being substantially unreactive with the amine-reactive sites of the copolymer of (a) and comprising propylene oxide, ethylene oxide, or mixture thereof, in an amount of about 20 to about 50 parts by weight per 100 parts by weight of (a).

17. The method of claim 16 wherein the composition comprises an ethylene graft copolymer comprising polyetherimide segments, wherein the ethylene graft copolymer comprises a trunk copolymer comprising copolymerized units of ethylene, copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer; and at least one type side chain polymer linked to said reactive sites through imide linkages, said side chain polymer being derived from a short chain polymer having from about 5 to 50 repeat units and containing one primary amine active amine site, the remainder of the side chain polymer being substantially unreactive with the amine-reactive sites of the trunk copolymer and comprising propylene oxide, ethylene oxide, or mixture thereof.

18. The method of claim 16 wherein the selectively permeable composition further comprises (c) an additional polymer present in an amount of about 10 to about 50 weight % of the combination of (a), (b) and (c), comprising polyethylene homopolymers, polyethylene copolymers, polypropylene homopolymers or polypropylene copolymers; or at least one ethylene copolymer comprising copolymerized units of ethylene and copolymerized units of a polar comonomer selected from vinyl acetate, alkyl methacrylate, alkyl acrylate, carbon monoxide or mixtures thereof, wherein said polar comonomer is present in the copolymer in an amount from about 6 to about 40 weight %.

19. The method of claim 16 wherein the article is selectively permeable to moisture having a moisture vapor transmission rate, measured according to ASTM F2298, of at least 1800 g/m2/24 h.

20. The method of claim 16 wherein selectively permeable protective structure comprises a substrate wherein the substrate or a portion thereof is coextruded, impregnated, incorporated, laminated embedded or coated with the composition.

21. The method of claim 20 wherein the substrate comprises textile or porous sheet material; and the substrate is coated with the composition.

22. The method of claim 20 wherein the selectively permeable composition provides a monolithic or continuous membrane and the substrate is porous film, flash spun nonwoven fabric, woven fabric of synthetic fiber, natural fiber, scrim, paper, filter material, or combinations of two or more thereof.

* * * * *